United States Patent Office 3,268,413
Patented August 23, 1966

3,268,413
CULTIVATION OF MICRO-ORGANISMS ON A HYDROCARBON FEEDSTOCK IN THE FORM OF SMALL PARTICLES DISPERSED INTO A FLUID PHASE UNDER THE ACTION OF ULTRA-SONIC WAVES
Bernard Maurice Laine and Charles Vernet, Lavera, France, assignors to The British Petroleum Company Limited, London, England, a British joint-stock corporation
No Drawing. Filed Dec. 16, 1963, Ser. No. 330,528
Claims priority, application Great Britain, Dec. 31, 1962, 49,061/62, 49,062/62; Feb. 26, 1963, 7,623/63
14 Claims. (Cl. 195—3)

This invention relates to cultivation of micro-organisms on a hydrocarbon feedstock in the form of small particles dispersed into a fluid phase under the action of ultrasonic waves.

According to the present invention there is provided a process in which a micro-organism is cultivated in a fermenter in the presence of a combined carbon-containing feedstock; in the presence of an aqueous nutrient medium; and in the presence of a gas containing free oxygen; wherein the feedstock is present in the fermenter in the form of small particles.

Preferably the particles are of an average diameter less than 30 microns. It is particularly preferred that this average diameter shall be less than 10 microns.

The small particles may be formed by atomising a liquid phase feedstock into an aqueous phase or into a gas phase. The small liquid particles formed in gas phase must be transferred into a liquid medium for example an aqueous phase. The dispersion of small particles in the liquid carrier medium may then be passed into the fermenter; alternatively the small liquid particles may be formed within the fermenter by direct atomisation into the liquid material in the fermenter. The aqueous medium used for forming the dispersion outside the fermenter may consist of aqueous nutrient medium.

The fluid phase which is passed through the atomiser may be, if desired, a mixture of hydrocarbon feedstock with either air or aqueous medium.

If desired a fluid phase is passed through the atomiser to form a suspension of fine liquid particles in a gas, the suspended material being caused to fall onto a moving liquid surface, for example of aqueous nutrient medium.

If desired the small liquid particles may be formed by dispersing a liquid phase feedstock into an aqueous phase or into a gas phase under action of ultra-sonic waves.

Preferably there is passed through an ultra-sonic wave generating device a fluid phase which is a mixture of a hydrocarbon feedstock with either air or aqueous medium.

If desired a fluid phase is passed through the ultrasonic wave generating device to form a suspension of fine liquid particles in a gas, the suspended material being caused to fall on to a moving liquid surface, for example of aqueous nutrient medium.

Also, according to another aspect of the present invention there is provided a process in which a micro-organism is cultivated in the presence of a combined carbon-containing feedstock in the presence of an aqeous nutrient medium; and in the presence of a gas containing free oxygen, wherein the feedstock is present in the form of small solid particles.

The feedstock will be a material which is a solid at the temperature at which the fermenter is operated.

Preferably the small solid particles are formed as a suspension in a liquid medium by atomising the melted feedstock (in the presence or absence of other constituents) into a liquid medium which is at a temperature below the melting point of the feedstock, whereby shock cooling of the feedstock takes place.

In another preferred method there is formed a liquid-in-liquid suspension or solution of the feedstock in a liquid medium and this suspension or solution is subjected to shock cooling to form a solid-in-liquid suspension of the feedstock in the liquid medium. The liquid-in-liquid suspension may be formed by atomising the melted solid feedstock into a liquid medium which is at a temperature above the melting point of the feedstock.

The liquid medium (whether employed above or below the melting point of the feedstock as described above) will preferably be an aqueous phase or a hydrocarbon phase.

A suitable aqueous phase consists of aqueous nutrient medium.

A suitable hydrocarbon phase will consist of hydrocarbons which are not metabolised by the micro-organism. Thus usually a dewaxed gas oil will be suitable.

Preferably conditions will be used which give a high rate of precipitation in order to promote the formation of fine particles. When using the feedstock in the form of small particles there is usually a tendency for the small particles to agglomerate. This tendency may be reduced by the use of emulsifying agents.

In accordance with another aspect of the present invention there is provided a process which comprises forming a dispersion of a feedstock in a liquid medium, mixing the dispersion with a micro-organism, passing the mixture to a fermenter containing a micro-organism, an aqueous nutrient medium and a free oxygen-containing gas and withdrawing a product stream containing a micro-organism grown in the fermenter.

In accordance with another aspect of the present invention there is provided a process which comprises forming a dispersion of a feedstock in a liquid medium, mixing the dispersion with a micro-organism, passing the mixture to a fermenter containing a micro-organism, an aqueous nutrient medium and a free oxygen-containing gas and withdrawing a product stream containing a micro-organism grown in the fermenter.

In accordance with another aspect of the present invention there is provided a process which comprises forming a dispersion of a hydrocarbon feedstock in a liquid medium which contains a dispersion of a micro-organism, thereafter passing the mixture to a fermenter containing a micro-organism, an aqueous nutrient medium and a free oxygen-containing gas and withdrawing a product stream containing a micro-organism grown in the fermenter.

In accordance with either aspect of the invention which has been described, the micro-organism which is present in the feed stream to the fermenter and the micro-organism which is being grown in the fermenter may be the same or different. The presence of the micro-organism with the dispersed feedstock reduces the tendency of the particles to agglomerate.

Preferably the micro-organism which is present in the feed stream to the fermenter is a yeast. The process is particularly suitable for the growth of a yeast and in this case part of the yeast recovered from the fermenter may be employed in the formation of the feed stream.

Preferably the liquid medium which is employed as the continuous phase in the formation of the feed stream is an aqueous medium. Preferably this aqueous medium is a recycle stream of aqeous nutrient medium.

Preferably the total liquid phase product stream withdrawn from the fermenter is passed to a centrifuge in which is recovered (a) a phase containing a major proportion of the micro-organism which is present in the product stream, (b) an aqueous phase containing a minor proportion of the micro-organism, and (c) optionally according to the nature of the hydrocarbon feedstock, a hydrocarbon phase.

At least part of the aqueous phase, containing some of the micro-organism, may then be employed as a continuous phase in which the hydrocarbon feedstock is dispersed. The amount of micro-organism present in the aqueous phase may be inadequate to maintain the dispersion of feedstock; in this case (and anyway if so desired) the amount of micro-organism may be increased by the addition of further quantities of a micro-organism after the dispersal stage. Suitably this further quantity of micro-organism is a part of or is derived from the fraction (a) recovered by centrifuging, the larger agglomerates of micro-organism are separated from the aqueous phase and only the smaller groups of micro-organism carry on in the aqueous phase to the dispersal stage; since the operation of dispersing the feedstock may lead to some destruction of the groups of micro-organisms, or even of the individual cells, it is an advantage to operate a system in which at least part of the micro-organism used for stabilising the dispersion is caused to by-pass the dispersal stage and this part should be the part which (by reason of the larger agglomerates which it contains) is the part which is more susceptible to damage.

Any convenient method of dispersing the feedstock in a liquid medium may be employed. Suitable methods include the use of (i) an injector nozzle, (ii) a colloid mill, for example a Hurrel homogeniser, or (iii) ultra-sonic waves.

The combined carbon-containing feedstock may be a carbon, hydrogen and oxygen containing material for example a carbohydrate. A special feedstock which may be employed is an extract of lipids, for example obtained in the purification of yeast by solvent extraction. Other possible feedstocks are unsaturated fatty acids or unsaturated fats, for example rancid fats.

Preferably the feedstock is a straight chain hydrocarbon or a mixture of hydrocarbons containing a straight chain hydrocarbon. Preferably the hydrocarbon is $C_{10}$ or higher. Suitably there may be used a hydrocarbon fraction derived from petroleum.

It is well-known that certain petroleum fractions, particularly gas oils, contain straight chain hydrocarbons, mainly paraffins which are waxes and which have an adverse effect upon the pour point of the fraction; that is to say, when these hydrocarbons are removed, wholly or in part, the pour point of the fraction is lowered. Usually the wax is removed by precipitation by means of solvents, the wax originally present in the fraction being recovered as such, that is, without conversion to more valuable products.

The petroleum fractions boiling below the gas oils, for example, heavy naphthenes and kerosines also contain straight chain hydrocarbons which are potentially valuable for conversion to other products but hitherto, in general, utilisation of these hydrocarbons has been rendered difficult by the necessity of recovering these hydrocarbons from the petroleum fractions, in which they are contained, before they can be converted to other products.

According to a preferred feature of this invention there is provided a process which comprises cultivating a micro-organism in the manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas containing free oxygen and separating from the mixture, on the one hand, the micro-organism and, on the other hand, a petroleum fraction having a reduced proportion of straight chain hydrocarbons or which is free of said straight chain hydrocarbons.

The process of the invention is of particular value for the treatment of petroleum gas oil fractions which contain straight chain hydrocarbons in the form of waxes, since by the process of the invention, a gas oil of improved pour point is obtained while the waxes are converted to a valuable product.

Usually the straight-chain hydrocarbons will be present in the feedstocks according to the invention as paraffins; however, the straight chain hydrocarbons may be present as olefins; also there may be used a mixture containing straight chain paraffins and olefins.

It is an important feature of this invention that when cultivating yeasts in the presence of the feedstocks hereinbefore described under conditions favouring the growth of the yeasts at the expense of the straight chain hydrocarbons, the other hydrocarbons, for example isoparaffins, naphthenes and aromatics are not metabolised or, at most, the proportion which is metabolised is very small. Furthermore, unlike conventional chemical processes governed by the law of mass action, the rate of removal of straight chain hydrocarbons is not substantially reduced as the proportion of these hydrocarbons in the overall mixture of hydrocarbons decreases (except, of course, in the very final stages of removal). Thus, when desired, the percentage conversion of straight chain hydrocarbons which is achieved can be maintained at a value approaching 100% without necessitating a very disproportionate expenditure of contact time to achieve small improvements. Furthermore, in the continuous process, this high percentage conversion can be achieved without resorting to the use of a long reaction path.

By the application of this process under conditions which limit the metabolisation of the straight chain hydrocarbons it is possible to operate with the removal of only a desired proportion of these hydrocarbons.

Suitable feedstocks to the process of the invention include kerosine, gas oils and lubricating oils; these feedstocks may be unrefined or may have undergone some refinery treatment, but will usually be required to contain a proportion of straight chain hydrocarbons in order to fulfil the purpose of this invention. Suitably the petroleum fraction will contain 3–45% by weight of straight chain hydrocarbons.

Micro-organisms which are cultivated as herein described may be yeasts, moulds or bacteria.

Preferably when a yeast is employed this is of the family Cryptococcaceae and particularly of the sub-family Cryptococcoideae; however, if desired there may be used, for example, ascosporogeneous yeasts of the sub-family Saccharomycoideae. Preferred genera of the Cryptococcoideae sub-family are Torulopsis (also known as Torula) and Candida. Preferred strains of yeast are as follows. In particular it is preferred to use the specific stock of indicated Baarn reference numbers; these reference numbers refer to stock held by the Centraal Bureau vor Schimmelculture, Baarn, Holland:

*Candida, lipolytica*
*Candida, pulcherrima,* CBS 610
*Candida, utilis*
*Candida, utilis,* variati *major,* CBS 841
*Candida, tropicalis,* CBS 2317
*Torulopsis, collisculosa,* CBS 133
*Hansenula, anomala,* CBS 110
*Oidium, lactis*
*Neurospora, sitophila*

Of the above *Candida lipolytica* is particularly preferred.

If desired, the micro-organism may be a mould. A suitable strain is *Pencillium expansum*.

If desired, the micro-organism may be bacterium. Suitably the bacteria are of one of the orders: Pseudomonadales, Eubacteriales and Actinomycetales.

Preferably the bacteria which are employed are of the family Bacillaceae and Pseudomonadaceae. Preferred species are *Bacillus megaterium, Bacillus subtilis* and *Pseu-*

*domonas aeruginosa.* Other strains which may be employed include:

*Bacillus amylobacter*
*Pseudomonas natriegens*
Arthrobacter sp.
Micrococcus sp.
Corynebacterium sp.
*Pseudomonas syringae*
*Xanthomonas begoniae*
*Flavobacterium devorans*
Acetobacter sp.
Actinomyces sp.

Suitable moulds are of the family Aspergillaceae. A suitable genus is Pencillium.

Preferably there is used *Pencillium expansum.* Another suitable genus is Aspergillus.

Usually the cultivation is carried out in the presence of an aqueous nutrient medium. If desired, certain solid nutrient media may be employed.

In either case, a gas containing free oxygen must be provided.

*Pencillium expansum* is suitable for cultivation in an aqueous nutrient medium containing hydrocarbons.

*Pencillium roqueforti, Pencillium notatum, Aspergillus fussigatus* and *Aspergillus niger, Aspergillus versicolor* may be used for cultivation on a solid agent containing hydrocarbons as feedstock.

For the growth of the micro-organism it will be necessary to provide, in addition to the feedstock, an aqueous nutrient medium and a supply of oxygen, preferably in the form of air.

A typical nutrient medium for the growth of Nocardia, a genus in the Actinomycetales order, has the following composition:

| | Grams |
|---|---|
| Ammonium sulphate | 1 |
| Magnesium sulphate | 0.20 |
| Ferrous sulphate, $7H_2O$ | 0.005 |
| Manganese sulphate, $1H_2O$ | 0.002 |
| Monopotassium phosphate | 2 |
| Disodium phosphate | 3 |
| Calcium chloride | 0.1 |
| Sodium carbonate | 0.1 |
| Yeast extract | 0.008 |
| Distilled water (to make up to 1000 mls.). | |

For other bacteria a suitable nutrient medium has the composition:

| | |
|---|---|
| Monopotassium phosphate, grams | 7 |
| Magnesium sulphate, $7H_2O$, gram | 0.2 |
| Sodium chloride, gram | 0.1 |
| Ammonium chloride, grams | 2.5 |
| Tap water (trace elements), mls. | 100 |
| Yeast extract, grams | 0.025 |
| Made up to 1000 mls. with distilled water. | |

A suitable nutrient medium for yeasts (and moulds) has the composition:

| | Grams |
|---|---|
| Diammonium phosphate | 2 |
| Potassium chloride | 1.15 |
| Magnesium sulphate, $7H_2O$ | 0.65 |
| Zinc sulphate | 0.17 |
| Manganese sulphate, $1H_2O$ | 0.045 |
| Ferrous sulphate, $7H_2O$ | 0.068 |
| Tap water | 200 |
| Yeast extract | 0.025 |
| Distilled water (to make up to 1000 mls.). | |

Micro-organisms, and in particular yeasts, when first cultivated with the use of hydrocarbon fractions as feedstock sometimes grow with difficulty and it is sometimes necessary to use an inoculum of a micro-organism which has previously been adapted for growth on the hydrocarbon fraction which it is intended to use. Furthermore the micro-organism although cultivated in the presence of an aqueous mineral medium containing the appropriate nutrient elements may grow with difficulty, because the hydrocarbon fraction does not contain the growth factors which exist in carbohydrate feedstocks, unless these growth factors are added.

The growth of the micro-organism used is favoured by the addition to the culture medium of a very small proportion of extract of yeast (an industrial product rich in vitamins of group B obtained by the hydrolysis of a yeast) or more generally of vitamins of group B and/or biotin. This quantity is preferably of the order of 25 parts per million with reference to the aqueous fermentation medium. It can be higher or lower according to the conditions chosen for the growth.

The growth of the micro-organism takes place at the expense of the feedstock fraction with the intermediate production of bodies having an acid function, principally fatty acids, in such manner that the pH of the aqueous mineral medium progressively diminishes. If one does not correct it the growth is fairly rapidly arrested and the concentration of the micro-organism in the medium, that is cellular density, no longer increases so that there is reached a so-called stationary phase.

Preferably therefore the aqueous nutrient medium is maintained at a desired pH by the step-wise or continuous addition of an aqueous medium of high pH value. Usually, when using moulds or yeasts and in particular when using *Candida lipolytica,* the pH of the nutrient medium will be maintained in the range 3–6 and preferably in the range 4–5. (Bacteria require a higher pH, usually 6.5–8.) Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using *Candida lipolytica* the preferred temperature range is 28–32° C.

The take-up of oxygen is essential for the growth of the micro-organism. The oxygen will usually be provided as air. In order to maintain a rapid rate of growth the air, used to provide oxygen, should be present in the form of fine bubbles under the action of stirring. The air may be introduced through a sintered surface. However there may be used the system of intimate aeration known as "vortex aeration."

It has been found that by the use of yeast of the strain *Candida lipolytica* in a process according to the invention in which aeration is effected by "vortex aeration," a high growth rate is achieved whereby the generation time lies in the range 2–5 hours and the cell concentration is increased by a factor of up to 12 in two days.

In batch operation, the micro-organism will usually grow initially at a low rate of increase in cellular density. (This period of growth is referred to as the "lag phase".) Subsequently the rate of growth will increase to a higher rate of growth; the period at the higher rate of growth is referred to as the "exponential phase" and subsequently again the cellular density will become constant (the "stationary phase").

A supply of the micro-organism for starting the next batch will preferably be removed before the termination of the exponential phase.

The growth operation will usually be discontinued before the stationary phase.

At this stage, the micro-organism will usually be separated from the bulk of the aqueous nutrient medium and from the bulk of the unused feedstock fraction.

If desired the micro-organism may be subjected to autolysis before further purification of the product.

According to one method of treating the product the major part of the continuous aqueous phase is first separated; preferably this is carried out by centrifuging or decanting. The separated aqueous phase will usually contain a greater concentration of non-nutritive ions than can be tolerated in the recycle stream and when this is so, only a proportion of the recovered aqueous phase can be recycled. Thus it will usually be possible to separate ca. 96% by wt. of the aqueous phase which is present in the product, of which on the same percentage basis, ca. 20% by wt. will be discarded. The recycle stream is supplied with make-up quantities of the necessary nutrients and is returned to the fermenter; if desired the make-up materials may be fed to the fermenter as a separate stream.

The process, as applied to the cultivation of a yeast, may incorporate product separation stages as follows. In some cases micro-organisms other than yeasts may be separated in this manner.

By centrifuging the product from the fermenter three fractions are recovered. These are in order of increasing density:

(i) An oil phase containing yeast cells,
(ii) An aqueous phase containing traces of oil and yeast, and
(iii) A yeast "cream" consisting of yeast, having a quantity of oil fixed on to the cells, together with aqueous phase.

After recovery of fraction (ii), fraction (iii) or a blend of fractions (i) and (iii) is mixed with an aqueous solution of a surfactant.

The purpose of this treatment is to separate the oil from the yeast cells; the oil being apparently held to the cells by adsorption.

It may be advantageous to employ an edible surfactant, for example a saccharose ester, which makes it possible to reduce the subsequent washing required to remove from the yeast a surfactant which is not edible.

The emulsion so formed is broken down by centrifuging to obtain three fractions.

(iv) An oil phase,
(v) An aqueous phase containing surfactant, which phase is recycled for the treatment of fractions (i) and (iii), and
(vi) A yeast "cream," consisting of yeast still contaminated by oil together with an aqueous surfactant phase.

In order to reduce as far as possible the consumption of surfactant product, the aqueous washing solution containing it is recycled.

Fraction (vi) may be further treated by alternate washing with surfactant and centrifuging until the oil content of the yeast has reached a desired low value. The yeast "cream" now consisting of yeast and aqueous surfactant may now be washed with water and again centrifuged. If desired two or more washings may be given to this yeast "cream." If desired, one or more of these water washings (but preferably not the last) may make use of salt water (for example sea water); preferably the final wash is with soft water. With a view to economising the soft water necessary for the process, the whole of this water coming from the last washing is employed for making up the nutritive medium for the fermentation, where necessary at the stage of washing with the solution of surfactant, and the rest is sent to the salt water used for washing with a view to reducing its salt concentration. Finally the yeast may be dried under conditions suitable for its subsequent use as a foodstuff.

Other steps which may be taken to obtain a purified micro-organism or a product derived therefrom or to improve the process in respect of the production of the unmetabolised hydrocarbon fraction are described in the following applications; the use of any process step or steps therein described in association with the process herein described lies within the scope of the present invention.

Preferred methods for use in the cultivation of the micro-organism and for the recovery of the product are described in British patent specification No. 914,567—also in British patent application Nos.:

44,606/62 (SFP 1300)
46,906/62 (SFP 1300-A)
49,049/62 (SFP 1407)
49,050/62 (SFP 1408)
49,051/62 (SFP 1409)
49,052/62 (SFP 1410)
49,053/62 (SFP 1411)
49,054/62 (SFP 1412)
49,055/62 (SFP 1413)
49,056/62 (SFP 1414)
49,057/62 (SFP 1415)
49,058/62 (SFP 1416)
49,059/62 (SFP 1417)
49,060/62 (SFP 1418)
49,063/62 (SFP 1421)
1,168/63 (SFP 1426)
49,068/62 (SFP 1427)
49,069/62 (SFP 1428)
2,234/63 (SFP 1404)
20,803/63 (SFP 1442)
20,084/63 (SFP 1443)
21,253/63 (SFP 1441)
21,668/63 (SFP 1456)
25,210/63 (SFP 1401)

Also in the Specifications of French patent application No. 924,254 (SFP 1402),
Also in the specification of copending application No. (SFP 1400–X).

The stages of the process may be carried out entirely batchwise. However, if desired, any one or more stages herein described may be carried out in continuous manner.

The invention is illustrated but not limited with reference to the following examples.

Throughout these examples cellular density is expressed as dry weight of yeast per litre of culture.

*Example 1*

Gas-oil and the culture medium were pumped from two containers to the two branches of an injector by means of two piston pumps. Buffer reservoirs were interposed between the pumps and the injector to steady the back-pressure, which was regulated to lie in the range 14–16 kg./cm.$^2$.

The injector consisted of a stainless steel capillary tube (interior diameter 0.5 mm.) having the free end narrowed to leave an outlet hole of 0.05 to 0.08 mm. The other end of the capillary was welded to the two inlet tubes for gas-oil and medium to form a Y.

The pumps were capable of control to give a flow which can vary between 0.3 and 1 litre/hour.

The mixture of gas-oil and culture medium from the injector passed into a five-litre continuous fermenter provided with:

An agitator
  Speed _____ 1000
  Blade diameter/vat diameter ratio _____ 1/3
  Number of blades _____ 8
A ring of capillary air injectors.
Electrodes for pH control (pH maintained at 4).
Double external cladding to keep the temperature constant at 30° C. by water circulation.
System for drawing off liquid by means of a piston pump.

For the injection of the mixed gas-oil and medium as a fine dispersion using the system described above, the capillary point of the injector may be mounted either in the body of the liquid (preferably beneath the agitator) or above the surface and pointing towards the bottom of the fermenter.

The materials employed were as follows:

Yeast stock _____ Candida lipolytica.
Gas-oil _____ Iraq heavy gas-oil.
  Percent by wt. n-paraffins _____ 12.
  Pour point _____ +17° C.

Aqueous mineral nutrient medium:

| | Grams |
|---|---|
| Diammonium phosphate | 2 |
| Potassium chloride | 1.15 |
| Magnesium sulphate, $7H_2O$ | 0.65 |
| Zinc sulphate | 0.17 |
| Manganese sulphate, $1H_2O$ | 0.045 |
| Ferrous sulphate, $7H_2O$ | 0.068 |
| Yeast extract | 0.025 |
| Tap water | 200 |

Distilled water to 1000 ml.
Air, filtered and compressed.

To demonstrate the significance of using the pressure injection system, the following experiments were carried out:

(1) Culture with feed of gas-oil and medium in separate circuits without previous atomisation.

(2) Culture with atomisation of the mixture of gas-oil and medium by means of the system of capillary compression—injection with capillary submerged.

(3) As in 2, but with the capillary above the surface of the liquid (injection in air).

The following results were obtained:

| | Experiment 1 | Experiment 2 | Experiment 3 |
|---|---|---|---|
| | No atomisation | Atomisation in liquid | Atomisation in air |
| Volume of liquid in fermenter (litres) | 3 | 3 | 3 |
| Dilution rate | 0.07 | 0.10 | 0.11 |
| Air flow, v./v./hr | 70 | 70 | 70 |
| Liquid flow, litres/hour | 0.21 | 0.3 | 0.33 |
| Gm. gas-oil per litre of feed | 180 | 180 | 180 |
| Cellular density, grams/litre | 5 | 5 | 5.5 |
| Average size of gas-oil globules | 100 | 10 | 6 |
| Cell division time, hr | 10 | 7 | 6½ |
| Percent n-paraffins consumed | 41 | 40 | 43 |

It will be noted that dispersion by capillary injection appreciably lowers the cell division time while preserving the same degree of dewaxing, that is, the rate of production of yeast and of dewaxed gas-oil is increased without altering the degree of dewaxing.

*Example 2*

This example illustrates the use of feedstock formed by the dispersion of solid paraffin wax.

The solid substrate (hard gatsch or solid paraffin wax) was melted in a container and injected as a fine dispersion in air into the culture medium in the fermenter, using an air atomiser consisting of a capillary tube mounted in a concentric air inlet tube.

The injection can be made either into the body of the liquid or above the surface of the liquid. The fermenter employed was a five-litre fermenter as described in Example 1.

Materials employed were as follows:

Dunkirk hard gatsch (M.P. 60° C.)
Paraffin wax (M.P. 60–70° C.)
Heavy Iraq gas-oil (pour point +17° C.; normal paraffins by wt. 12%
Yeast: *Candida lipolytica*

The aqueous mineral nutrient medium was as described in Example 1.

Thte following experiments were undertaken with the object of making a finely divided solid substrate, rich in or enriched with normal paraffins, available to the yeast.

(1) Culture with ordinary heavy gas-oil without preliminary atomisation.

(2) Culture with dispersion of hard gatsch.

(3) Culture with heavy gas-oil enriched with paraffin wax, atomised.

The following results were obtained:

| | (1) | (2) | (3) |
|---|---|---|---|
| | Gas-oil not atomised | Gatsch atomised | Gas-oil +wax atomised |
| Volume of liquid (litres) | 3 | 3 | 3 |
| Dilution rate | 0.10 | 0.10 | 0.10 |
| Air flow, vol./vol./hour | 70 | 70 | 70 |
| Liquid flow, litres/hour | 0.3 | 0.3 | 0.3 |
| Gas oil substrate, grams per litre of medium | 180 | 180 | 180 |
| Cellular density | 4 | 8.5 | 9 |
| Size of substrate particles | 100 | 5 | 10 |
| Dewaxing, percent by weight of paraffins in feed | 32 | 69 | 73 |

The use of a fine dispersion of gatsch or of gas-oil enriched with solid paraffins produced by an air atomiser results in a marked increase in the cellular density for the same dilution.

This shows that the availability of normal paraffins can be thus increased; the practical interest lies in the improved hourly production of yeast and dewaxed gas-oil without altering the quality of the latter.

*Example 3*

This example illustrates the use of a feedstock which has been dispersed by ultra-sonic vibration.

Gas-oil feedstock and the culture medium were pumped by a rotary pump to an ultra-sonic vibration apparatus known as a "sifflet liquide," "fluid whistle." This is made up of a very fine steel plate mounted in front of a flattened tube which constitutes the flat jet by which the liquids enter.

The assembly was mounted in a cylindrical container forming a resonance chamber.

The frequency employed was of the order of 20 to 22 kc./s.

The outlet of the "whistle" was connected to the fermenter by means of a flexible plastic pipe of 50 cms. length.

The fermenter was a five-litre continuous fermenter as described in Example 1.

Materials employed were:

Yeast _____ Candida lipolytica.
Gas-oil _____ Heavy Iraq gas-oil containing 12% by wt. of n-paraffins.
Culture medium _____ Aqueous mineral nutrient medium as described in Example 1.
Air _____ Filtered and compressed.

The significance of the ultra-sonic system is shown by the following experiments:

(1) Culture without preliminary dispersion of the gas-oil.

(2) Culture with ultra-sonic dispersion of gas-oil.

| Experiment | 1 (No dispersion) | 2 (Dispersion) |
|---|---|---|
| Volume of liquid, litres | 3 | 3 |
| Aeration, v./v./hr | 70 | 70 |
| Gas-oil content of feed, grams/litre | 180 | 180 |
| Dilution | 0.1 | 0.1 |
| Liquid flow, litres/hour | 0.3 | 0.3 |
| Cellular density, grams/litre | 4 | 9 |
| Size of gas-oil globules (microns) | 100 | 5 |
| Dewaxing, percent by wt. of n-paraffin in feed | 32 | 74 |

It is apparent that the ultra-sonic dispersion system increases the cellular density for a given rate of dilution; in other words it increases the availability of the gas-oil substrate to the yeasts.

One can in this way increase the yeast production while increasing the dilution, keeping the same cellular density.

This corresponds to an appreciable shortening of the cell division time.

Example 4

This example illustrates the stabilisation of gas-oil dispersions used as feedstock by means of yeasts.

Dispersion of a gas-oil feedstock in a mineral medium was carried out in a colloidal mill known as a Seila microdisperser in which the shearing effect was supplied by two systems mounted on the same axis of rotation, that is:

Shearing by toothed wheel,
Shearing by two conical surfaces.

The outlet of the apparatus was connected by a flexible pipe to the fermenter. To stabilise the emulsion formed, a quantity of culture liquor equal to about 5% of the volume of the emulsion and containing 8–9 grams/litre of yeast was injected into the liquid material at either the inlet or the outlet of the colloidal mill.

The fermenter was stirred at 1000 r.p.m. and had a capacity of 3 litres. It was fitted with a drawing-off system and a pump.

The pH was controlled using electrodes and an automatic potentiometer.

Materials employed were:

| | |
|---|---|
| Yeast | Candida lipolytica. |
| Gas-oil | Heavy gas oil. |
| Pour point | +17° C. |
| n-Paraffins content | 12%. |
| Medium | Aqueous mineral nutrient medium as in Example 1. |
| Air | Filtered and compressed. |

To demonstrate the significance of the colloidal mill and the stabilisation of the dispersion by yeasts, the following experiments were carried out:

(1) Culture on gas-oil without preliminary dispersion.
(2) Culture on gas-oil with preliminary dispersion by colloidal mill but without stabilisation by yeast.
(3) Culture on gas-oil with dispersion and stabilisation by recycle of some product yeast to the inlet of the colloidal mill.

| Experiment | 1 | 2 | 3 |
|---|---|---|---|
| Volume of liquid, litres | 3 | 3 | 3 |
| Dilution | 0.10 | 0.10 | 0.10 |
| Liquid flow, litres/hr | 0.3 | 0.3 | 0.3 |
| Gas-oil content, grams/litre | 180 | 180 | 180 |
| Aeration, v./v./hr | 70 | 70 | |
| Average size oil globules (microns) | 100 | 10 | 5 |
| Cellular density (grams/litre) | 4 | 8 | 10 |
| Percent paraffins consumed by wt | 32 | 65 | 81 |

It is apparent that the use of the colloidal mill produces an emulsion which is sufficiently dispersed to increase the cellular density significantly.

The presence of yeast in the emulsion maintains the high degree of dispersion and appreciably improves the growth of the yeasts.

We claim:

1. A process for the cultivation of a combined carbon-containing feedstock micro-organism selected from the group consisting of yeasts, bacteria of the orders Pseudomonadales, Eubacteriales and Actinomycetales; and *Pencillium expansum* in which a micro-organism is cultivated in a fermenter in the presence of a combined carbon-containing liquid feedstock; in the presence of an aqueous nutrient medium; and in the presence of a gas containing free oxygen; wherein the liquid feedstock is present in the fermenter in the form of small particles dispersed into a fluid phase under the action of ultra-sonic waves.

2. A process according to claim 1 in which the particles are of an average diameter less than 30 microns.

3. A process according to claim 2 in which the average diameter is less than 10 microns.

4. A process according to claim 1 in which the fluid phase consists of aqueous nutrient medium.

5. A process according to claim 1 in which the micro-organism which is cultivated is a yeast.

6. A process according to claim 5 in which the yeast is of the family Cryptococcaceae.

7. A process according to claim 6 in which the yeast is of the sub-family Cryptococcoideae.

8. A process according to claim 7 in which the yeast is of the genus Torulopsis.

9. A process according to claim 7 in which the yeast is of the genus Candida.

10. A process according to claim 7 in which the yeast is *Candida lipolytica*.

11. A process according to claim 1 in which the feedstock consists at least in part of straight chain hydrocarbons.

12. A process according to claim 11 in which the feedstock is a petroleum fraction.

13. A process according to claim 1 in which straight chain hydrocarbons are removed from a petroleum fraction with production of a micro-organism, wherein the feedstock employed for the growth of the micro-organism is a petroleum fraction consisting in part of straight chain hydrocarbons, wherein there is recovered from the product of the growth of the microorganism a petroleum fraction having a reduced proportion of straight chain hydrocarbons.

14. A process according to claim 13 for the removal, at least in part, of waxes from a wax-containing petroleum gas oil, wherein the feedstock is a wax-containing petroleum gas oil and wherein there is recovered, from the product of the growth of the micro-organism, a gas oil of reduced content of wax.

References Cited by the Examiner

UNITED STATES PATENTS

| | | | |
|---|---|---|---|
| 2,697,061 | 12/1954 | Harris et al. | 195—1 |
| 2,697,062 | 12/1954 | Cramer | 195—1 |
| 3,019,170 | 1/1962 | Weaver | 195—51 |

A. LOUIS MONACELL, *Primary Examiner.*

D. M. STEPHENS, *Assistant Examiner.*